(12) United States Patent
Kuramochi et al.

(10) Patent No.: US 12,043,774 B2
(45) Date of Patent: Jul. 23, 2024

(54) REACTIVE HOT-MELT ADHESIVE COMPOSITION, AND BONDED BODY AND METHOD FOR PRODUCING SAME

(71) Applicant: Showa Denko Materials Co., Ltd., Tokyo (JP)

(72) Inventors: Chika Kuramochi, Tokyo (JP); Souichirou Komiya, Tokyo (JP); Junichi Kamei, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 415 days.

(21) Appl. No.: 17/430,237

(22) PCT Filed: Feb. 3, 2020

(86) PCT No.: PCT/JP2020/003974
§ 371 (c)(1),
(2) Date: Aug. 11, 2021

(87) PCT Pub. No.: WO2020/166414
PCT Pub. Date: Aug. 20, 2020

(65) Prior Publication Data
US 2022/0112405 A1  Apr. 14, 2022

(30) Foreign Application Priority Data
Feb. 14, 2019 (JP) ................. 2019-024572

(51) Int. Cl.
| | |
|---|---|
| *C09J 7/35* | (2018.01) |
| *C08G 18/12* | (2006.01) |
| *C08G 18/42* | (2006.01) |
| *C08G 18/76* | (2006.01) |
| *C08K 5/5419* | (2006.01) |
| *C08K 5/548* | (2006.01) |
| *C09J 175/06* | (2006.01) |

(52) U.S. Cl.
CPC ............... *C09J 7/35* (2018.01); *C08G 18/12* (2013.01); *C08G 18/4202* (2013.01); *C08G 18/4238* (2013.01); *C08G 18/7671* (2013.01); *C08K 5/5419* (2013.01); *C08K 5/548* (2013.01); *C09J 175/06* (2013.01); *C09J 2301/12* (2020.08); *C09J 2301/304* (2020.08); *C09J 2469/006* (2013.01); *C09J 2479/026* (2013.01)

(58) Field of Classification Search
CPC ...... C08G 18/10; C08G 18/12; C08G 18/289; C08G 18/307; C08G 18/4018; C08G 18/4202; C08G 18/4238; C08G 18/4825; C08G 18/7671; C08G 2170/20; C08K 5/5419; C08K 5/548; C09J 11/06; C09J 175/04; C09J 175/06; C09J 175/08; C09J 2301/12; C09J 2301/304; C09J 2469/006; C09J 2477/00; C09J 2479/026; C09J 7/35; C09J 7/38
USPC .......... 156/60, 307.1, 307.3, 331.7; 524/871, 524/875; 428/423.1, 355 N; 528/44
See application file for complete search history.

(56) References Cited

U.S. PATENT DOCUMENTS

| | | | | |
|---|---|---|---|---|
| 4,625,012 A | * | 11/1986 | Rizk | C08G 18/809 156/330 |
| 5,472,785 A | * | 12/1995 | Stobbie, IV | C08G 18/4238 525/440.12 |
| 6,465,104 B1 | * | 10/2002 | Krebs | C08G 18/12 525/131 |
| 6,660,376 B1 | * | 12/2003 | Zimmel | C09J 5/06 428/317.1 |
| 10,253,226 B2 | † | 4/2019 | Matsuki | |
| 2007/0232764 A1 | * | 10/2007 | Minamida | C08G 18/4018 525/453 |
| 2008/0308226 A1 | * | 12/2008 | Imai | C08G 18/10 525/453 |
| 2009/0159204 A1 | * | 6/2009 | Burckhardt | C08G 18/12 525/454 |
| 2017/0130106 A1 | * | 5/2017 | Matsuki | C08G 18/7671 |

FOREIGN PATENT DOCUMENTS

| | | |
|---|---|---|
| CN | 106459722 A | 2/2017 |
| CN | 107922816 A | 4/2018 |
| JP | S52-037936 A | 3/1977 |
| JP | S64-054089 A | 3/1989 |
| JP | H6-122860 A | 5/1994 |
| JP | 2015-229738 A | 12/2015 |
| WO | 2011/033992 A1 | 3/2011 |
| WO | 2016/002518 A1 | 1/2016 |

\* cited by examiner
† cited by third party

*Primary Examiner* — Philip C Tucker
*Assistant Examiner* — Brian R Slawski
(74) *Attorney, Agent, or Firm* — FITCH, EVEN, TABIN & FLANNERY LLP

(57) ABSTRACT

Disclosed is a reactive hot-melt adhesive composition, containing: a urethane prepolymer having a polymer chain including a structural unit derived from polyol and a structural unit derived from polyisocyanate, and an isocyanate group as a terminal group of the polymer chain; and a functional group protection type silane coupling agent.

11 Claims, No Drawings

REACTIVE HOT-MELT ADHESIVE COMPOSITION, AND BONDED BODY AND METHOD FOR PRODUCING SAME

CROSS-REFERENCE TO RELATED APPLICATIONS

This application is a U.S. national phase application filed under 35 U.S.C. § 371 of International Application No. PCT/JP2020/003974, filed Feb. 3, 2020, designating the United States, which claims priority from Japanese patent application No. 2019-024572, filed Feb. 14, 2019, which are hereby incorporated herein by reference in their entirety.

TECHNICAL FIELD

The present invention relates to a reactive hot-melt adhesive composition, and a bonded body and a method for producing the same.

BACKGROUND ART

A hot-melt adhesive has a small load on the environment and the human body since it is a solventless adhesive, and is an adhesive suitable for improving productivity since it enables brief adhesion. The hot-melt adhesive can be broadly divided into two types of adhesives of an adhesive containing a thermoplastic resin as a main component and an adhesive containing a reactive resin as a main component. As the reactive resin, a urethane prepolymer having an isocyanate group at a terminal has been mainly used.

A reactive hot-melt adhesive containing a urethane prepolymer as a main component exhibits a certain level of adhesion strength in a short period of time by cooling and solidifying the adhesive itself after being applied. After that, a high molecular weight is obtained and cross-linkage is caused by a reaction between a terminal isocyanate group of the urethane prepolymer and the moisture (the moisture in the air or on the surface of an adherend), and thus, heat resistance is exhibited. Such an adhesive indicates a "moisture-hardening reactive hot-melt adhesive". The reactive hot-melt adhesive containing the urethane prepolymer as a main component exhibits excellent adhesion strength even during heating. In addition, in order to improve the adhesion strength at the initial stage and after hardening, a reactive hot-melt adhesive composition containing a urethane prepolymer, a thermoplastic resin, and a tackifier has been also known (for example, refer to Patent Literatures 1 to 3).

CITATION LIST

Patent Literature

Patent Literature 1: JP No. H06-122860
Patent Literature 2: JP No. S64-054089
Patent Literature 3: JP No. S52-037936

SUMMARY OF INVENTION

Technical Problem

Recently, the reactive hot-melt adhesive composition has been used in various base materials, in accordance with the diversification of a wearable terminal or the like. However, in the reactive hot-melt adhesive composition of the related art, the adhesion strength may not be sufficiently obtained in accordance with the type of base material to be applied, and in particular, there is a room for further improvement in the adhesion strength with respect to a polyamide base material.

Therefore, a main object of the present invention is to provide a reactive hot-melt adhesive composition exhibiting sufficient adhesion strength even in the case of being applied to a polyamide base material.

Solution to Problem

One aspect of the present invention provides a reactive hot-melt adhesive composition, containing: a urethane prepolymer having a polymer chain including a structural unit derived from polyol and a structural unit derived from polyisocyanate, and an isocyanate group as a terminal group of the polymer chain; and a functional group protection type silane coupling agent. Such a reactive hot-melt adhesive composition is capable of exhibiting sufficient adhesion strength even in the case of being applied to a polyamide base material.

A content of the functional group protection type silane coupling agent may be 0.4 to 5 parts by mass with respect to a total amount of 100 parts by mass of the urethane prepolymer.

Another aspect of the present invention provides a bonded body, including: a first adherend; a second adherend; and a hardened product of the reactive hot-melt adhesive composition described above, for the first adherend and the second adherend to adhere to each other.

Another aspect of the present invention provides a method for producing a bonded body, including: forming an adhesive layer by melting the reactive hot-melt adhesive composition described above to be applied to a first adherend; obtaining a bonded body precursor by disposing a second adherend on the adhesive layer and by compressing the second adherend; and hardening the adhesive layer in the obtained bonded body precursor.

Advantageous Effects of Invention

According to the present invention, a reactive hot-melt adhesive composition exhibiting sufficient adhesion strength even in the case of being applied to a polyamide base material is provided. In addition, according to the present invention, a bonded body and a method for producing the same, using such a reactive hot-melt adhesive composition, are provided.

DESCRIPTION OF EMBODIMENTS

Hereinafter, an embodiment of the present invention will be described. However, the present invention is not limited to the following embodiment.

Herein, "polyol" indicates a compound having two or more hydroxyl groups in molecules.

Herein, "polyisocyanate" indicates a compound having two or more isocyanate groups in molecules.

[Reactive Hot-Melt Adhesive Composition]

A reactive hot-melt adhesive composition of one embodiment (hereinafter, may be simply referred to as an "adhesive composition") contains a urethane prepolymer and a functional group protection type silane coupling agent. Note that, in general, the reactive hot-melt adhesive composition is a moisture-hardening reactive hot-melt adhesive composition, in which the urethane prepolymer mainly has a high molecular weight by a reaction with the moisture in the air or the moisture on the surface of an adherend, and adhesion strength or the like can be exhibited.

The urethane prepolymer has a polymer chain including a structural unit derived from polyol and a structural unit derived from polyisocyanate, and an isocyanate group as a terminal group of the polymer chain. That is, the urethane prepolymer of this embodiment is a reactant of the polyol and the polyisocyanate, and has the isocyanate group as a terminal group of the reactant. The adhesive composition of this embodiment is capable of exhibiting excellent adhesion strength after moisture hardening by containing such a urethane prepolymer.

The polyol can be used without being particularly limited insofar as being a compound having two or more hydroxyl groups. The polyol may include polyester polyol and polyether polyol, from the viewpoint of further improving the adhesion strength. In this case, the urethane prepolymer is capable of having a polymer chain including a structural unit derived from polyester polyol, a structural unit derived from polyether polyol, and a structural unit derived from polyisocyanate.

By the polymer chain including the structural unit derived from the polyester polyol, a solidification time and a viscosity of the adhesive composition can be adjusted. As the polyester polyol, a compound generated by a polycondensation reaction between polyhydric alcohol and a polycarboxylic acid can be used. Polyester polyol, for example, may be a polycondensate of polyhydric alcohol having 2 to 15 carbon atoms and 2 or 3 hydroxyl groups and a polycarboxylic acid having 2 to 14 carbon atoms (including carbon atoms in a carboxyl group) and 2 to 6 carboxyl groups.

The polyester polyol may be linear polyester diol generated from diol and a dicarboxylic acid, or may be branched polyester triol generated from triol and a dicarboxylic acid. In addition, the branched polyester triol can also be obtained by a reaction between diol and a tricarboxylic acid.

Examples of the polyhydric alcohol include aliphatic or alicyclic diols such as ethylene glycol, 1,2-propanediol, 1,3-propanediol, each isomer of butanediol, each isomer of pentanediol, each isomer of hexanediol, 2,2-dimethyl-1,3-propanediol, 2-methyl propanediol, 2,4,4-trimethyl-1,6-hexanediol, 2,2,4-trimethyl-1,6-hexanediol, 1,4-cyclohexanediol, and 1,4-cyclohexane dimethanol; and aromatic diols such as 4,4'-dihydroxy diphenyl propane, bisphenol A, bisphenol F, pyrocatechol, resorcinol, and hydroquinone. Only one type of the polyhydric alcohols may be used, or two or more types thereof may be used by being combined. Among them, aliphatic diol is preferable, and aliphatic diol having 2 to 6 carbon atoms is more preferable.

Examples of the polycarboxylic acid include aromatic polycarboxylic acids such as phthalic acid, isophthalic acid, terephthalic acid, and 1,2,4-benzene tricarboxylic acid; and aliphatic or alicyclic polycarboxylic acids such as maleic acid, fumaric acid, aconitic acid, 1,2,3-propane tricarboxylic acid, malonic acid, succinic acid, glutaric acid, adipic acid, pimelic acid, azelaic acid, sebacic acid, cyclohexane-1,2-dicarboxylic acid, and 1,4-cyclohexane diene-1,2-dicarboxylic acid. Only one type of the polycarboxylic acids may be used, or two or more types thereof may be used by being combined.

Instead of the polycarboxylic acid described above, a polycarboxylic acid derivative such as a carboxylic acid anhydride, and a compound in which a part of a carboxyl group is esterified can also be used. Examples of the polycarboxylic acid derivative include dodecyl maleate and octadecenyl maleate.

The polyester polyol may be crystalline polyester polyol, or may be amorphous polyester polyol. Here, whether the polyester polyol is crystalline or amorphous can be determined in a state at 25° C. Herein, the crystalline polyester polyol indicates polyester polyol that is crystalline at 25° C., and the amorphous polyester polyol indicates polyester polyol that is amorphous at 25° C. The polyol may include both of the crystalline polyester polyol and the amorphous polyester polyol as the polyester polyol.

A number average molecular weight (Mn) of the crystalline polyester polyol is preferably in a range of 500 to 10000, more preferably in a range of 800 to 9000, and even more preferably in a range of 1000 to 8000, from the viewpoint of improving waterproof properties and the adhesion strength. Note that, herein, the number average molecular weight is a value in terms of standard polystyrene that is measured by gel permeation chromatography (GPC). The measurement of GPC can be performed in the following condition.

Column: "Gelpack GLA130-S", "Gelpack GLA150-S", and "Gelpack GLA160-S" (manufactured by Hitachi Chemical Co., Ltd., packing column for HPLC)
Eluent: Tetrahydrofuran
Flow rate: 1.0 mL/minute
Column temperature: 40° C.
Detector: RI Examples of the amorphous polyester polyol include amorphous polyester polyol having a number average molecular weight of 3000 or less and amorphous polyester polyol having a number average molecular weight of 5000 or more. Mn of the amorphous polyester polyol having a number average molecular weight of 3000 or less is preferably in a range of 500 to 3000, and more preferably in a range of 1000 to 3000, from the viewpoint of improving the adhesion strength of the adhesive composition. Mn of the amorphous polyester polyol having a number average molecular weight of 5000 or more is preferably in a range of 5000 to 9000, and more preferably in a range of 7000 to 8000, from the viewpoint of improving impact resistance.

Only one type of the polyester polyols may be used, or two or more types thereof may be used by being combined. The content of the polyester polyol is preferably 70 to 90 parts by mass, and more preferably 75 to 85 parts by mass, with respect to the total amount of 100 parts by mass of the polyol, from the viewpoint of further improving the adhesion strength.

By the polymer chain including the structural unit derived from polyether polyol, suitable melt viscosity and open time of the adhesive composition after coating can be adjusted, and excellent workability, adhesiveness, waterproof properties, and flexibility can be imparted. Examples of the polyether polyol include polyethylene glycol, polypropylene glycol, polybutylene glycol, polytetramethylene glycol, and ethylene oxide-modified polypropylene glycol.

Mn of the polyether polyol is preferably in a range of 500 to 5000, more preferably in a range of 700 to 4500, and even more preferably in a range of 1000 to 4000, from the viewpoint of the initial adhesion strength, the adhesion strength after hardening, and a suitable open time after coating. Only one type of the polyether polyols may be used, or two or more types thereof may be used by being combined.

The content of the polyether polyol is preferably 10 to 30 parts by mass, and more preferably 15 to 25 parts by mass, with respect to the total amount of 100 parts by mass of the polyol, from the viewpoint of easily adjusting the viscosity of the adhesive composition to a low viscosity and of improving the adhesion strength with respect to the adherend.

The polyol may include polyol other than the polyester polyol and the polyether polyol.

The polyisocyanate can be used without being particularly limited insofar as being a compound having two or more isocyanate groups. Examples of the polyisocyanate include aromatic isocyanates such as diphenyl methane diisocyanate, dimethyl diphenyl methane diisocyanate, tolylene diisocyanate, xylylene diisocyanate, and p-phenylene diisocyanate; alicyclic isocyanates such as dicyclohexyl methane diisocyanate and isophorone diisocyanate; and aliphatic isocyanates such as hexamethylene diisocyanate. The polyisocyanate preferably includes aromatic diisocyanate, and more preferably includes diphenyl methane diisocyanate, from the viewpoint of reactivity and the adhesiveness. Only one type of the polyisocyanates may be used, or two or more types thereof may be used by being combined.

The urethane prepolymer can be synthesized by a reaction between the polyol and the polyisocyanate.

The urethane prepolymer of this embodiment has the polymer chain including the structural unit derived from the polyol and the structural unit derived from the polyisocyanate, and has the isocyanate group as the terminal group of the polymer chain. In the case of synthesizing such a urethane prepolymer, a ratio of an isocyanate group (NCO) equivalent of the polyisocyanate to a hydroxyl group (OH) of the polyol (Isocyanate Group (NCO) Equivalent of Polyisocyanate/Hydroxyl Group (OH) Equivalent of Polyol, NCO/OH) is greater than 1, preferably 1.5 to 3.0, and more preferably 1.8 to 2.5. When the ratio of NCO/OH is 1.5 or more, an excessive increase in the viscosity of the urethane prepolymer to be obtained is suppressed, and the workability tends to be easily improved. When the ratio of NCO/OH is 3.0 or less, foam formation is less likely to occur in a moisture hardening reaction of the adhesive composition, and a decrease in the adhesion strength tends to be easily suppressed.

The functional group protection type silane coupling agent is a silane coupling agent having a functional group such as a mercapto group and a hydroxy group in which the functional group is protected by a protective group. It is preferable that the protective group is desorbed by a reaction with the moisture. By the adhesive composition containing the functional group protection type silane coupling agent, an increase in the viscosity of the adhesive composition during heating can be suppressed, and sufficient adhesion strength can be exhibited even in the case of applying the adhesive composition to a polyamide base material. The reason for such a function is not exactly obvious, but one factor of an increase in the viscosity during heating is the presence of the functional group of the silane coupling agent, and in the functional group protection type silane coupling agent, the reason is considered that the functional group is protected by the protective group during heating, and in a stage where the urethane prepolymer in the adhesive composition is hardened by the reaction with the moisture, the functional group protection type silane coupling agent also reacts with the moisture to desorb the protective group, and the functional group capable of functioning with a base material such as the polyamide base material or the urethane prepolymer is generated.

Examples of the functional group protection type silane coupling agent include a compound represented by General Formula (1) below.

(1)

In General Formula (1), $R^1$ represents an alkoxy group, and a plurality of R's may be the same or different. E represents a group having a nitrogen atom, or a sulfur atom, and X represents a protective group. n represents an integer of 1 to 10.

Examples of the alkoxy group represented by $R^1$ include a methoxy group and an ethoxy group. The plurality of $R^1$s are preferably the same.

E is preferably a sulfur atom, from the viewpoint of more excellent stability of the adhesive composition during heating.

The protective group represented by X is not particularly limited insofar as being desorbed by the reaction with the moisture, and examples thereof include a trialkoxy silyl group and a group having an aryl group. The trialkoxy silyl group may be a trimethoxy silyl group or a triethoxy silyl group. The group having an aryl group may be a phenyl group or a benzyl group.

n is preferably 1 to 7, more preferably 1 to 5, and even more preferably 2 to 4.

Examples of a commercially available product of the functional group protection type silane coupling agent include "X12-1056ES" (product name), manufactured by Shin-Etsu Chemical Co., Ltd.

The content of the functional group protection type silane coupling agent may be 0.4 to 5 parts by mass with respect to the total amount of 100 parts by mass of the urethane prepolymer. The content of the functional group protection type silane coupling agent is preferably 0.5 parts by mass or more, more preferably 0.6 parts by mass or more, and even more preferably 0.8 parts by mass or more, and is preferably 4 parts by mass or less, more preferably 3.5 parts by mass or less, and even more preferably 3 parts by mass or less, with respect to the total amount of 100 parts by mass of the urethane prepolymer. When the content of the functional group protection type silane coupling agent is 0.4 parts by mass or more with respect to the total amount of 100 parts by mass of the urethane prepolymer, the adhesion strength of the adhesive composition tends to be more excellent. When the content of the functional group protection type silane coupling agent is 5 parts by mass or less with respect to the total amount of 100 parts by mass of the urethane prepolymer, a decrease in the impact resistance due to an excessive increase in an elastic modulus of a hardened product of the adhesive composition tends to be suppressible.

The content of the functional group protection type silane coupling agent may be 0.3 to 7 parts by mass with respect to the total amount of 100 parts by mass of the polyol configuring the urethane prepolymer. The content of the functional group protection type silane coupling agent is preferably 0.5 parts by mass or more, more preferably 0.7 parts by mass or more, even more preferably 1 part by mass or more, and particularly preferably 1.5 parts by mass or more, and is preferably 6.5 parts by mass or less, more preferably 6 parts by mass or less, even more preferably 5 parts by mass or less, and particularly preferably 4 parts by mass or less, with respect to the total amount of 100 parts by mass of the polyol configuring the urethane prepolymer. When the content of the functional group protection type silane coupling agent is 0.3 parts by mass or more with respect to the total amount of 100 parts by mass of the polyol configuring the urethane prepolymer, the adhesion strength of the adhesive composition tends to be more excellent. When the content of the functional group protection type silane coupling agent is 7 parts by mass or less with respect to the total amount of 100 parts by mass of the polyol configuring the urethane prepolymer, a decrease in the impact resistance due to an excessive increase in the elastic modulus of the hardened product of the adhesive composition tends to be suppressible.

The adhesive composition of this embodiment may contain other silane coupling agents other than the functional group protection type silane coupling agent.

The other silane coupling agents are not particularly limited, and silane coupling agents used in the adhesive field can be used. Among them, examples of the other silane coupling agents include a compound represented by General Formula (2) below.

$$(R^1)_3Si\text{—}(CH_2)_n\text{-E-H} \qquad (2)$$

$R^1$, E, and n in General Formula (2) are synonymous with $R^1$, E, and n in General Formula (1).

The content of the other silane coupling agents may be 0 to 1 part by mass with respect to the total amount of 100 parts by mass of the urethane prepolymer.

The adhesive composition of this embodiment may further contain a catalyst from the viewpoint of accelerating the hardening of the urethane prepolymer and of exhibiting higher adhesion strength. Examples of the catalyst include dibutyltin dilaurate, dibutyltin octoate, dimethyl cyclohexyl amine, dimethyl benzyl amine, and trioctyl amine.

The adhesive composition of this embodiment may further contain a thermoplastic polymer from the viewpoint of increasing rubber elasticity of an adhesive layer to be formed and of further improving the impact resistance. Examples of the thermoplastic polymer include polyurethane, an ethylene-based copolymer, a propylene-based copolymer, a vinyl chloride-based copolymer, an acrylic copolymer, and a styrene-conjugated diene block copolymer.

The adhesive composition of this embodiment may further contain a tackifier resin from the viewpoint of imparting stronger adhesiveness to the adhesive layer to be formed. Examples of the tackifier resin include a rosin resin, a rosin ester resin, a hydrogenated rosin ester resin, a terpene resin, a terpene phenol resin, a hydrogenated terpene resin, a petroleum resin, a hydrogenated petroleum resin, a coumarone resin, a ketone resin, a styrene resin, a modified styrene resin, a xylene resin, and an epoxy resin.

The adhesive composition of this embodiment may contain a suitable amount of an oxidant inhibitor, a pigment, an ultraviolet absorber, a surfactant, a flame retarder, a filler, and the like, as necessary.

In the adhesive composition of this embodiment, since the isocyanate group that is the terminal group of the urethane prepolymer reacts with the moisture in the air or the moisture on the surface of the adherend, for example, the adhesive composition can be hardened by performing curing at a temperature of 23° C. and humidity of 50% for 24 hours, and the hardened product of the adhesive composition can be obtained.

The adhesive composition of this embodiment can be produced by a method including obtaining the urethane prepolymer having the polymer chain including the structural unit derived from the polyol and the structural unit derived from the polyisocyanate, and the isocyanate group as the terminal group of the polymer chain, by the reaction between the polyol and the polyisocyanate; and mixing the obtained urethane prepolymer and the functional group protection type silane coupling agent. The adhesive composition of this embodiment can also be produced by a method including obtaining the urethane prepolymer having the polymer chain including the structural unit derived from the polyol and the structural unit derived from the polyisocyanate, and the isocyanate group as the terminal group of the polymer chain, by the reaction between the polyol and the polyisocyanate in the presence of functional group protection type silane coupling agent.

A temperature and a time for the reaction between the polyol and the polyisocyanate, for example, may be 85 to 120° C. and 1 minute to 48 hours.

A temperature and a time for mixing the urethane prepolymer and the functional group protection type silane coupling agent, for example, may be 85 to 120° C. and 1 minute to 48 hours. Note that, in the mixing, defoaming may be performed in a reduced pressure.

The viscosity of the adhesive composition at 120° C., which is measured by a rotation viscosimeter, is preferably 5 Pa·s or less, more preferably 4 Pa·s or less, and even more preferably 3.5 Pa·s or less, from the viewpoint of improving the coatability. A lower limit value of the viscosity is not limited, and for example, may be 1 Pa·s or more.

The adhesive composition of this embodiment enables various adherends to adhere to each other via the hardened product of the adhesive composition. Examples of the adherend include metal base materials such as SUS and aluminum, and non-metal base materials such as polycarbonate, polyamide, polyether imide, and glass. Since the adhesive composition of this embodiment is capable of exhibiting sufficient adhesion strength, in particular, even in a case where the adherend is the polyamide base material, at least one of the adherends may be the polyamide base material.

[Bonded Body and Method for Producing Same]

A bonded body of one embodiment includes a first adherend, a second adherend, and a hardened product of the reactive hot-melt adhesive composition described above, for the first adherend and the second adherend to adhere to each other. Examples of the bonded body of this embodiment include a semiconductor device, seamless clothes, and an electronic device.

The same adherends exemplified in the adherend described above can be exemplified as the first adherend and the second adherend. The adhesive composition of this embodiment is capable of exhibiting sufficient adhesion strength even in the case of being applied to the polyamide base material. For this reason, any one or both of the first adherend and the second adherend may be the polyamide base material.

The bonded body of this embodiment can be produced by a method including forming an adhesive layer by melting the reactive hot-melt adhesive composition described above to be applied to the first adherend, obtaining a bonded body precursor by disposing the second adherend on the adhesive layer and by compressing the second adherend, and hardening the adhesive layer in the obtained bonded body precursor.

A temperature for melting the adhesive composition, for example, may be 80 to 180° C. A method for applying the adhesive composition to the first adherend is not particularly limited, and a known method can be suitably applied.

Examples of a method for compressing the second adherend include a method for performing compression by using a pressure roll or the like.

A condition for hardening the adhesive layer in the bonded body precursor may be the same as the condition for hardening the adhesive composition described above.

EXAMPLES

Hereinafter, the present invention will be described in detail on the basis of examples, but the present invention is not limited thereto.

Examples 1 to 4 and Comparative Examples 1 and 2

<Preparation of Adhesive Composition>

Polyol (A) that was dehydrated in advance was added to a reaction container in a compounded amount shown in Table 1, and was homogeneously mixed. Next, polyisocyanate (B) was further added to the reaction container in a compounded amount shown in Table 1, and was homogeneously mixed such that a reaction was performed at 110° C. for 1 hour. A functional group protection type silane coupling agent (C) was added to a mixture that was obtained in a compounded amount shown in Table 1, was homogeneously mixed, and then, was defoamed and stirred in a reduced pressure at 110° C. for 1 hour to obtain adhesive compositions of Examples 1 to 4 and Comparative Examples 1 and 2. Note that, the unit of the compounded amount in Table 1 is parts by mass.

(Polyol (A))

A1: crystalline polyester polyol containing adipic acid and ethylene glycol as a main component (number of hydroxyl groups: 2, number average molecular weight: 5000)

A2: crystalline polyester polyol containing adipic acid and ethylene glycol as a main component (number of hydroxyl groups: 2, number average molecular weight: 2000)

A3: crystalline polyester polyol containing sebacic acid and 1,6-hexanediol as a main component (number of hydroxyl groups: 2, number average molecular weight: 5000)

A4: amorphous polyester polyol containing isophthalic acid and neopentyl glycol as a main component (number of hydroxyl groups: 2, number average molecular weight: 2000)

A5: polypropylene glycol (polyether polyol, number of hydroxyl groups: 2, number average molecular weight: 2000)

(Polyisocyanate (B))

B1: diphenyl methane diisocyanate (number of isocyanate groups: 2)

(Functional Group Protection Type Silane Coupling Agent (C))

C1: triethoxysilyl thiopropyl trimethoxysilane (a compound represented by General Formula (1) in which $R^1$ is a methoxy group, E is a sulfur atom, X is a triethoxy silyl group, and n is 3, product name: "X12-1056ES", manufactured by Shin-Etsu Chemical Co., Ltd.)

(Other Silane Coupling Agents (C') other than (C))

C'1: γ-mercapto-propyl trimethoxy silane (product name: "SILQUEST A-189 SILANE", manufactured by Momentive Performance Materials Japan LLC)

The respective properties of the adhesive compositions of Examples 1 to 4 and Comparative Examples 1 and 2 were evaluated as follows. Results are shown in Table 1. Note that, in the adhesive compositions of Comparative Examples 1 and 2 in which adhesion strength was not excellent, the other properties were not evaluated.

(Adhesion Strength)

The adhesive composition was melted at 100° C. to form an adhesive layer having Length of 1 mm×Width of 25 mm×Thickness of 100 μm on a polycarbonate (PC) base material having Length of 25 mm×Width of 75 mm×Thickness of 2 mm in an environment of a temperature of 23° C. and humidity of 50%, and then, a PC base material having Length of 25 mm×Width of 75 mm×Thickness of 2 mm was compressed against the adhesive layer to prepare a test piece. The test piece was left to stand for 1 day in an environment of a temperature of 23° C. and humidity of 50% to harden the adhesive composition, and then, a shear test (tension rate: 10 mm/minute) was performed, and adhesion strength (MPa) was measured. The same test was performed with respect to a polyamide (PA) base material, and the adhesion strength (MPa) was measured.

(Viscosity)

A melt viscosity of the adhesive composition (sample amount: 15 g) was measured by a TVB-25H type viscosimeter (manufactured by TOKI SANGYO CO., LTD.) at the number of rotor rotations of 50 rpm and 120° C. by using a rotor No. 4.

(Viscosity Increase Rate During Heating)

The adhesive composition was left to stand at 110° C. for 24 hours in a nitrogen atmosphere, viscosity measurement was performed, and a viscosity increase rate (Viscosity at 120° C. after Being at 110° C. for 24 hours/Initial Viscosity at 120° C.) was calculated.

(Mechanical Properties)

The adhesive composition was melted at 100° C. to form a film having a thickness of 100 μm, and then, the film was left to stand for 2 days in a constant temperature and humidity bath at a temperature of 23° C. and humidity of 50% to be hardened. The film after being left to stand was punched out with a dumbbell No. 1 to prepare a test piece, and a tensile elastic modulus (MPa), breaking strength (MPa), and breaking elongation (%) of the test piece were measured on the basis of JIS K-6251, by using Autograph AGS-X (manufactured by SHIMADZU CORPORATION).

TABLE 1

|  |  | Exam. 1 | Exam. 2 | Exam. 3 | Exam. 4 | Exam. 5 | Comp. Exam. 1 | Comp. Exam. 2 |
|---|---|---|---|---|---|---|---|---|
| (A) | A1 | 15 | 15 | 15 | 15 | 15 | 15 | 15 |
|  | A2 | 35 | 35 | 35 | 35 | 35 | 35 | 35 |
|  | A3 | 10 | 10 | 10 | 10 | 10 | 10 | 10 |
|  | A4 | 20 | 20 | 20 | 20 | 20 | 20 | 20 |
|  | A5 | 20 | 20 | 20 | 20 | 20 | 20 | 20 |
| (B) | B1 | 21 | 21 | 21 | 21 | 21 | 21 | 21 |
| (C) | C1 | 0.5 | 1 | 3 | 6 | 0.5 | 0 | 0 |
| Ratio (parts by mass) of (C) to total amount of 100 parts by mass of (A) and (B) |  | 0.41 | 0.82 | 2.48 | 4.96 | 0.41 | 0 | 0 |

TABLE 1-continued

|  |  | Exam. 1 | Exam. 2 | Exam. 3 | Exam. 4 | Exam. 5 | Comp. Exam. 1 | Comp. Exam. 2 |
|---|---|---|---|---|---|---|---|---|
| Ratio (parts by mass) of (C) to total amount of 100 parts by mass of (A) |  | 0.5 | 1 | 3 | 6 | 0.5 | 0 | 0 |
| (C') | C1 | — | — | — | — | 0.5 | — | 0.5 |
| Adhesion strength (MPa) | PC | 4.4 | 4.9 | 5.6 | 5.7 | 4.8 | 2.3 | 3.0 |
|  | PA | 4.0 | 4.5 | 5.4 | 5.3 | 4.3 | 1.5 | 3.1 |
| Viscosity (Pa·s) at 120° C. |  | 3.1 | 3.2 | 3.0 | 2.6 | 3.0 | — | — |
| Viscosity increase rate |  | 1.4 | 1.4 | 1.5 | 1.5 | 2.0 | — | — |
| Tensile elastic modulus (MPa) |  | 46 | 51 | 53 | 55 | 42 | — | — |
| Breaking strength (MPa) |  | 13 | 12 | 12 | 13 | 10 | — | — |
| Breaking elongation (%) |  | 921 | 988 | 1076 | 1132 | 872 | — | — |

The adhesive compositions of Examples 1 to 5, containing the functional group protection type silane coupling agent, exhibited sufficient adhesion strength even in the case of being applied to a polyamide base material, compared to the adhesive composition not containing the functional group protection type silane coupling agent. The adhesive compositions of Examples 1 to 5 had a low viscosity increase rate at the time of being heated at 110° C., and were also excellent in the mechanical properties after being hardened. From the above, it was checked that the adhesive composition of the present invention exhibited sufficient adhesion strength even in the case of being applied to the polyamide base material.

The invention claimed is:

1. A reactive hot-melt adhesive composition, comprising:
   a urethane prepolymer having a polymer chain including a structural unit derived from polyol and a structural unit derived from polyisocyanate, and an isocyanate group as a terminal group of the polymer chain, wherein the polyol comprises polyester polyol and a content of polyester polyol is at least 70 parts by mass with respect to a total amount of 100 parts by mass of polyol; and
   a functional group protection type silane coupling agent.

2. The reactive hot-melt adhesive composition according to claim 1,
   wherein a content of the functional group protection type silane coupling agent is 0.4 to 5 parts by mass with respect to a total amount of 100 parts by mass of the urethane prepolymer.

3. The reactive hot-melt adhesive composition according to claim 1,
   wherein the polyester polyol comprises two or more types of polyester polyols.

4. The reactive hot-melt adhesive composition according to claim 1,
   wherein a viscosity of the adhesive composition at 120° C., measured by a rotation viscosimeter, is 5 Pa·s or less.

5. The reactive hot-melt adhesive composition according to claim 1,
   wherein a viscosity of the adhesive composition at 120° C., measured by a rotation viscosimeter, is 4 Pa·s or less.

6. The reactive hot-melt adhesive composition according to claim 5,
   wherein the polyester polyol comprises two or more types of polyester polyols.

7. The reactive hot-melt adhesive composition according to claim 1,
   wherein a viscosity of the adhesive composition at 120° C., measured by a rotation viscosimeter, is 3.5 Pa·s or less.

8. A bonded body, comprising:
   a first adherend;
   a second adherend; and
   a hardened product of the reactive hot-melt adhesive composition according to claim 1, for the first adherend and the second adherend to adhere to each other.

9. The bonded body according to claim 8,
   wherein at least one of the first and second adherends comprises a polyamide base material.

10. A method for producing a bonded body, comprising:
    forming an adhesive layer by melting the reactive hot-melt adhesive composition according to claim 1 to be applied to a first adherend;
    obtaining a bonded body precursor by disposing a second adherend on the adhesive layer and by compressing the second adherend; and
    hardening the adhesive layer in the obtained bonded body precursor.

11. The method for producing a bonded body according to claim 10,
    wherein at least one of the first and second adherends comprises a polyamide base material.

* * * * *